United States Patent [19]

Nagai et al.

[11] Patent Number: 4,972,416
[45] Date of Patent: Nov. 20, 1990

[54] ERROR DETECTION AND CORRECTION METHOD

[75] Inventors: Kiyotaka Nagai; Michihiro Matsumoto, both of Osaka, Japan

[73] Assignee: Matsushita Electric Industrial Co., Ltd., Osaka, Japan

[21] Appl. No.: 268,778

[22] Filed: Nov. 9, 1988

[30] Foreign Application Priority Data

Nov. 13, 1987 [JP] Japan ................................ 62-287859

[51] Int. Cl.$^5$ ............................................. G06F 11/10
[52] U.S. Cl. .................................................. 371/37.4
[58] Field of Search .................... 371/37.4, 37.5, 38.1, 371/39.1, 40.3, 37.1

[56] References Cited

U.S. PATENT DOCUMENTS

| 4,541,092 | 9/1985 | Sako | 371/40.3 X |
|---|---|---|---|
| 4,646,301 | 2/1987 | Okamoto | 371/37.4 |
| 4,653,051 | 3/1987 | Sugimura | 371/37.4 |
| 4,719,628 | 1/1988 | Ozaki | 371/37.4 |
| 4,760,576 | 7/1988 | Sako | 371/37.4 |

FOREIGN PATENT DOCUMENTS 0136604 4/1985 European Pat. Off. .
0140381 5/1985 European Pat. Off. .
0169540 1/1986 European Pat. Off. .

OTHER PUBLICATIONS

"Digital Taperrecorder System (R-DAT) Recommended Design Standard", DAT Conference Held on Apr., 16, 1986.
Fox and Hugand: "Implementation of Reed-Solomon Erasure-Correcting Decoder for Hybrid Coding Scheme", IEEE Trans. Commun. Tech. vol. COM-19, No. 4, pp. 543-546 (Aug. 1971).
Forney: "On Decoding BCH Codes", IEEE Trans. Inf. Theory vol. IT-11 No, 4, pp. 549-557 (Oct. 1965).

*Primary Examiner*—Jerry Smith
*Assistant Examiner*—Robert W. Beausoliel
*Attorney, Agent, or Firm*—Stevens, Davis, Miller & Mosher

[57] ABSTRACT

In an error detection and correction method, when decoding second codewords of doubly encoded information codes, the second codewords, which are considered to have a correlation with the occurrence of burst errors, are classified into groups on the basis of the decoding states of first codewords of the doubly encoded information codes, and the second codewords are decoded sequentially in the order of a group having lower error misdetection probability and on the basis of the decoding states of the second codewords, namely, the error occurrence states, up to that time, thereby enhancing the error detection capability.

3 Claims, 9 Drawing Sheets

ERROR DETECTION AND CORRECTION METHOD

BACKGROUND OF THE INVENTION

1. Field of the Invention

The present invention relates to a method for detecting and correcting errors in error detection and correction codes which are used in PCM recording and reproducing of analog signal information such as music signals.

2. Description of the Related Art

Conventionally, error detection and correction codes have been used in order to detect and correct errors produced in recording and transferring pulse-code-modulated information. Particularly, in the case where a recording/transferring medium which may result in many errors, a plurality of error detection and correction codes have been used in a multiplexed manner such that error correction and detection is carried out using the respective codes, thereby enhancing the entire error detection and correction capability.

One such prior art is an error detection and correction method disclosed in "DIGITAL AUDIO TAPERECORDER SYSTEM (R-DAT) RECOMMENDED DESIGN STANDARD" issued Apr. 16, 1986 by the DAT Conference, which will be explained below R-DAT (Rotationary Head Digital Audio Taperecorder) is a taperecorder for recording and reproducing a PCM audio signal on a magnetic tape using a rotationary head. In its mandatory mode, the two channel audio signals are recorded and reproduced with the quantizing bit number of 16 bits and at the sampling frequency of 48 KHz.

Generally, magnetic recording systems require stabilized contact between a head and a tape, but it is inevitable that a contact state is casually deteriorated due to flaws or dust on the tape. Thus, an error correction code is added to the PCM audio signal to make it possible to reproduce the PCM audio signal correctly, even if a recording/reproducing state of the PCM signal is deteriorated. R-DAT adopts the doubly-encoded Reed-Solomon code as this error correction code.

In R-DAT, an audio signal quantized in 16 bits is divided into two 8 bit data portions called "symbol", which include upper 8 bits and lower 8 bits, and thereafter the 8 bit data are encoded with the doubly-encoded Reed-Solomon code.

FIG. 1 shows an arrangement of the doubly-encoded Reed-Solomon code As seen from FIG. 1, one page of an error detection and correction code is constituted by lengthwise 32 symbols which constitute a first codeword called "$C_1$ code" and breadthwise 32 symbols which constitute a second codeword called "$C_2$ code". One page consists of 32 codewords of the $C_1$ code and 32 codewords of the $C_2$ code.

The $C_1$ code is a Reed-Solomon code of (32, 28, 5) on a Galois field GF ($2^8$) consisting of 28 data symbols and 4 parity symbols (the parity in the $C_1$ code is referred to as P partiy). The $C_2$ code is a Reed-Solomon code of (32, 26, 7) on a Galois field GF ($2^8$) consisting of 26 data symbols and 6 parity symbols (the parity in the $C_2$ code is referred to as Q parity). The minimum distance of the $C_1$ code represents a minimum value of the Hamming distance between all different codewords in the $C_1$ code; and the value of this minimum distance between codes is 5. Thus, error correction can be made up to 4 symbols, if the error locations are known, and, up to 2 symbols, if they are not known. The minimum distance of the $C_2$ code is 7. Thus, error correction can be made up to 6 symbols, if the error locations are known, and, up to 3 symbols, if they are not known.

The occurrence pattern of errors can be roughly classified into a random error and a burst error The countermeasure for the burst error is critical for R-DAT The burst error means that errors successively occur due to the flaws or defects on the tape. When the burst. error occurs, data are lost in a concentrated location, so that it is difficult to correct or conceal (interpolating using the data before and after the erroneous data) the errors. Then, in order to disperse the burst error into several codewords so that the burst error is converted into a shorter burst error or a random error, a technique of interleaving in which the codewords are recorded in a dispersed manner is used.

FIG. 2 is a view showing a format of interleaving the error detection and correction codes of R-DAT, and it shows, as a whole, one track formed by helical scanning of the rotary head.

On an actual magnetic recording tape, one track is formed on the magnetic recording tape by sequentially recording 128 columns in total in such a way that a first leftmost column of the error detection and correction codes shown in FIG. 2 is recorded sequentially from top to bottom in the vertical direction, then a second column adjacent to the first column is recorded, and so on. One track is constituted by four pages each of which pages is represented by a shaded part in FIG. 2 and corresponds to the whole configuration of the error detection and correction code shown in FIG. 1. Therefore, one track is constituted by $128 \times 32 = 4096$ symbols The $C_1$ code is interleaved in the vertical direction in the order of $31 \rightarrow 30 \rightarrow 29 \rightarrow \ldots \rightarrow 0$ at every other symbols which are adjacent to each other.

The $C_2$ code is interleaved in the horizontal direction in the order of $31 \rightarrow 30 \rightarrow 29 \rightarrow \ldots \rightarrow 0$ at every four symbols extending over one entire track.

FIG. 3 shows the procedure of decoding in the conventional error detection and correction method for the error detection and correction codes constituted as mentioned above.

The decoding of the doubly-encoded codes is performed in two steps such that the first codewords are initially decoded to output flags representative of the decoding states and thereafter the second codewords are decoded on the basis of the flags representative of the first codewords to output the decoding states of the second codewords.

However, this conventional error detection and correction method has a disadvantage in that the quality of a reproduced signal is deteriorated when a burst error occurs, and particularly it is greatly deteriorated when the pulse noise (unusual sound) due to misdetection of an error is produced. For example, in the case where, in decoding the second codewords, erasure correction is to be carried out on the basis of the flags representative of the decoding states of the first codewords, if a condition of six erasures is satisfied, six erasure corrections are unconditionally carried out. Thus, if there is an error at a location other than the locations where six flags stand, misdetection of the error necessarily occurs, thus producing an unusual sound.

SUMMARY OF THE INVENTION

An object of the present invention is to provide an error detection and correction method with increased error detection capability when burst errors occur.

To attain this object, an error detection and correction method in accordance with the present invention comprises, in order to decode information codes which have been encoded doubly by error detection and correction codes, a first decoding step of decoding first codewords and then outputting the decoding states thereof; and a second decoding step of decoding second codewords in such a matter that the second codewords are classified into K (K≧2) groups in accordance with the decoding states of the first codewords, the second codewords contained in a first group are decoded on the basis of the decoding states of the first codewords and then the decoding states thereof are outputted, and the second codewords contained in the i-th (2≦i≦K) group are decoded on the basis of the decoding states of the first codewords and those of the second codewords contained in the first group to the (i−1)-th group and then the decoding states thereof are outputted.

By means of the method mentioned above, the present invention decodes the second codewords in such a manner that the second codewords, which are considered to have a correlation with the occurrence of burst errors, are classified into plural groups in accordance with the decoding states of the first codewords, the second codewords are decoded sequentially from a first group having a lower error misdetection probability and the second codewords contained in an i-th group are decoded on the basis of the decoding states, i.e. the error occurrence states, of the second codewords contained in the first to (i−1)-th groups, thereby reducing error misdetection and preventing the occurrence of an unusual sound which deteriorates the quality of a reproduced signal.

DESCRIPTION OF THE PREFERRED EMBODIMENTS

Figure 4:
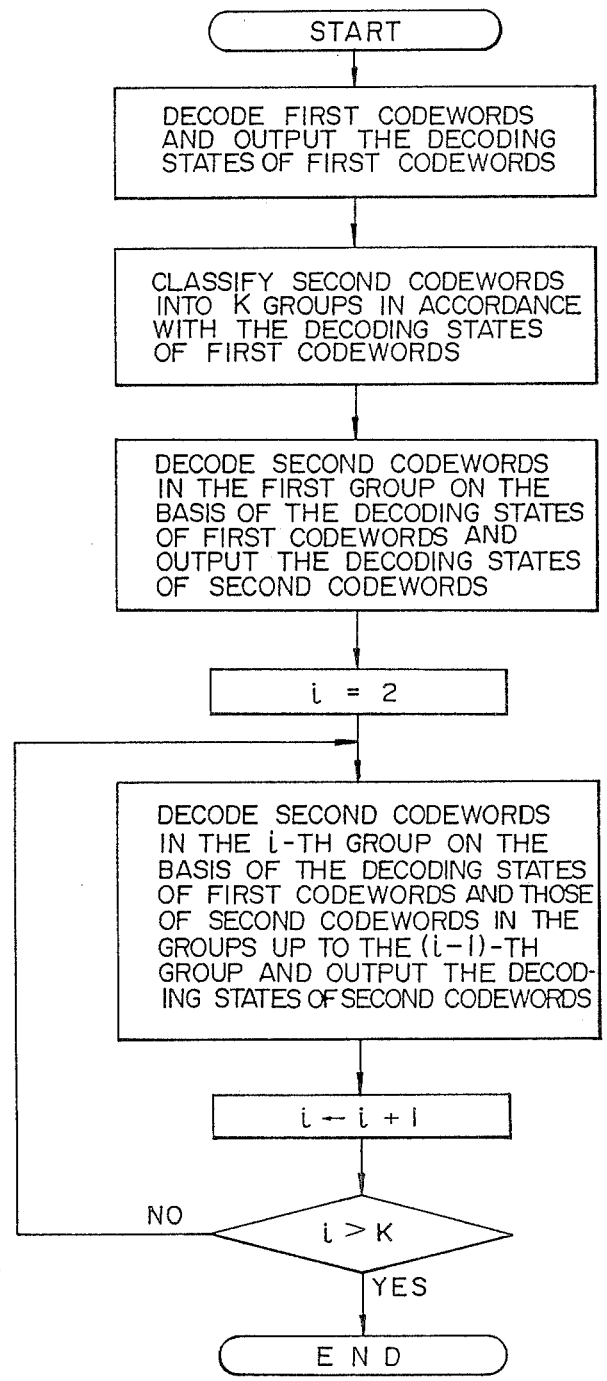
FIG. 4 is a flowchart showing the decoding process of the error detection and correction method of an embodiment of the present invention.

FIG. 4 is flowchart showing the process of decoding in the error detection and correction according to one embodiment of the present invention. This embodiment uses doubly-encoded Reed-Solomon codes as doubly-encoded error detection and correction codes as in the prior art.

Figure 5:
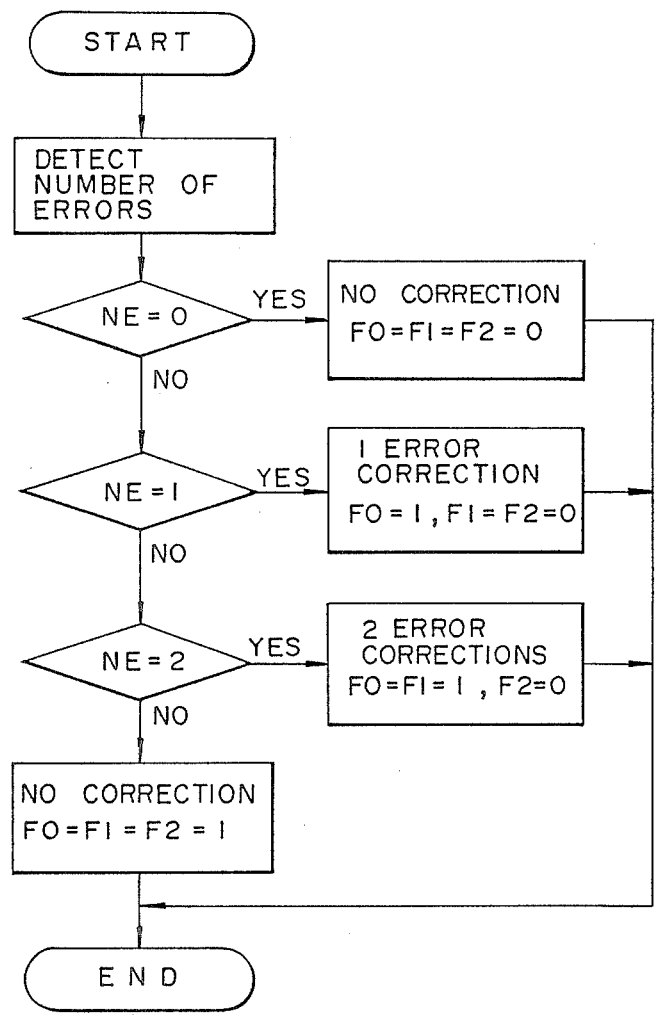
FIG. 5 is a flowchart showing the process of decoding a first codeword shown in FIG. 4.

In decoding the doubly-encoded error detection and correction codes, in a first decoding step, first codewords are decoded and then flags representative of the decoding states are outputted. FIG. 5 is a flowchart showing the process of decoding the first codewords.

In FIG. 5, NE represents the number of errors detected by the first codewords, and F0, F1 and F2 are flags indicating the decoding states of the first codewords, which are referred to as first flags.

In decoding the first codewords, the number of errors is initially detected. If the number of errors is 0, the correction is not performed, but only the first flags (F0=F1=F2=0) are outputted. If the number of errors is 1 or 2, the correction corresponding to the number of errors is performed and the first flags (F0=1, F1=F2=0; F0=F1=1, F2=0) are outputted, respectively. If the number of errors is 3 or more, the correction is not performed, but only the first flags (F0=F1=F2=1) are outputted.

Referring to FIG. 4 again, in a second decoding step, second codewords are classified into K (K≧2) groups corresponding to the number of the first flags representative of the decoding states of the first codewords. Next, the second codewords belonging to the first group is decoded on the basis of the decoding states of the first codewords, and also interpolation flags representative of the decoding states are outputted. The second codewords belonging to the i (2≦i≦K, where K=the number of groups)-th group are decoded on the basis of the decoding states of the first codewords and those of the second codewords belonging to the first to (i-1)-th groups, and the decoding states are outputted. Incidentally, the second codewords are classified into groups in the order of having a lower error misdetection probability.

The second decoding step which is a feature of the present invention will be explained in further detail with reference to FIG. 6.

Figure 6:
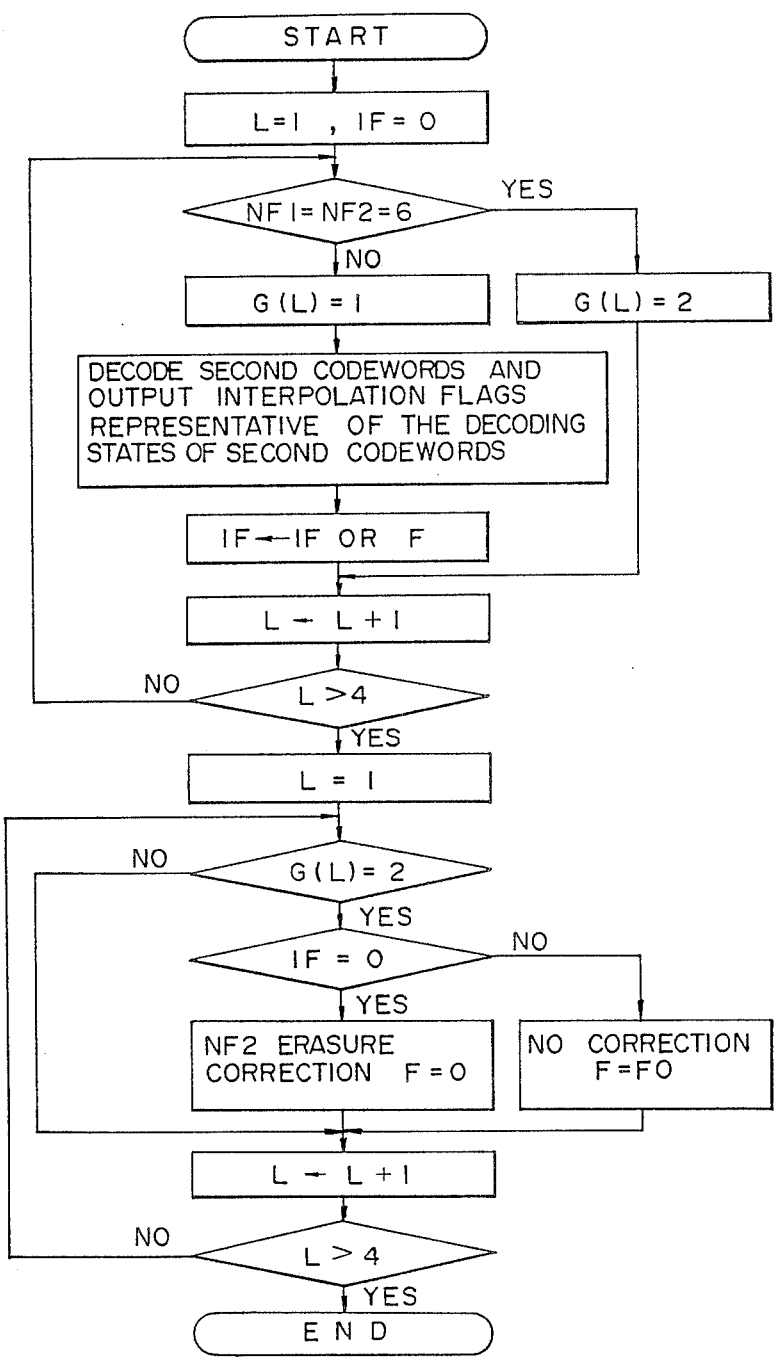
FIG. 6 is a flowchart showing the detail of the second decoding process shown in FIG. 4.

In FIG. 6, the second decoding step is carried out for each track which is a unit of completing the interleaving of the error detection and correction codes (as mentioned above, four pages of the error detection and correction codes constitute one track). L (1≦L≦4) denotes a page of the error detection and correction code. The number of groups (K) is 2. G(L), which denotes the group number on the L page, takes the value of 1 or 2. IF is a logical sum of all the interpolation flags F in the group number of 1. The condition of classifying the second codewords is a six erasure condition of NF1=NF2=6 which provides a higher burst error misdetection probability (NF1 and NF2 denote the number of F1 flags and F2 flags counted for the second codewords, respectively). The number of the group G(L), when this condition is not satisfied, is 1, and the number of the group G(L), when this condition is satisfied, is 2.

Firstly, L=1 and IF=0 are initialized. The second codewords are classified into two groups depending on whether the condition NF1=NF2=6 is satisfied or not. When this condition is satisfied, the group number G(L) is set to 2. When this condition is not satisfied, the group number G(L) is set to 1, and the second codewords are decoded Namely, the second codewords are decoded on the basis of the decoding states of the first codewords and then interpolation flags F representative of the decoding states thereof are outputted.

Figure 7:
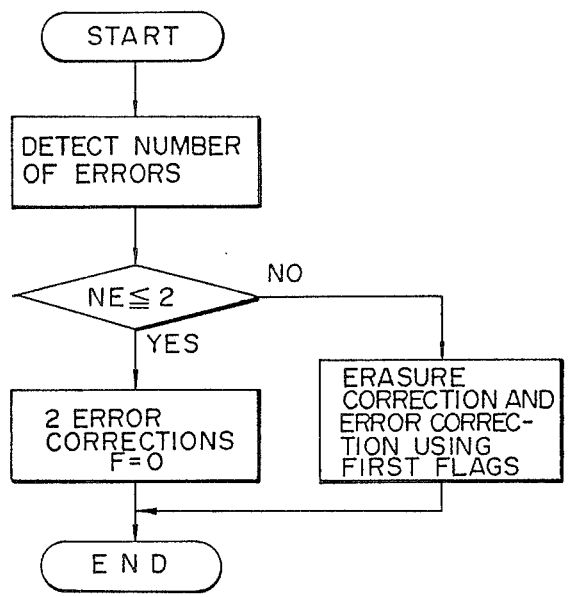
FIG. 7 is a flowchart showing the process of decoding a second codeword shown in FIG. 6.

FIG. 7 shows a flowchart showing the process of decoding the second codewords. In FIG. 7, NE denotes the number of errors detected by the second codewords. F denotes an interpolation flag. F=0 represents the absence of interpolation, whereas F=1 represents the presence of interpolation. In decoding the second codewords, the number of errors is initially detected Then, if the number of errors is 2 or less, the error correction is performed and the interpolation flag F=0 is set. If the number of errors is 3 or more, the erasure correction and error correction are performed using the first flags The process of erasure correction and error correction using the first flags will be explained with reference to FIG. 8.

Figure 8:
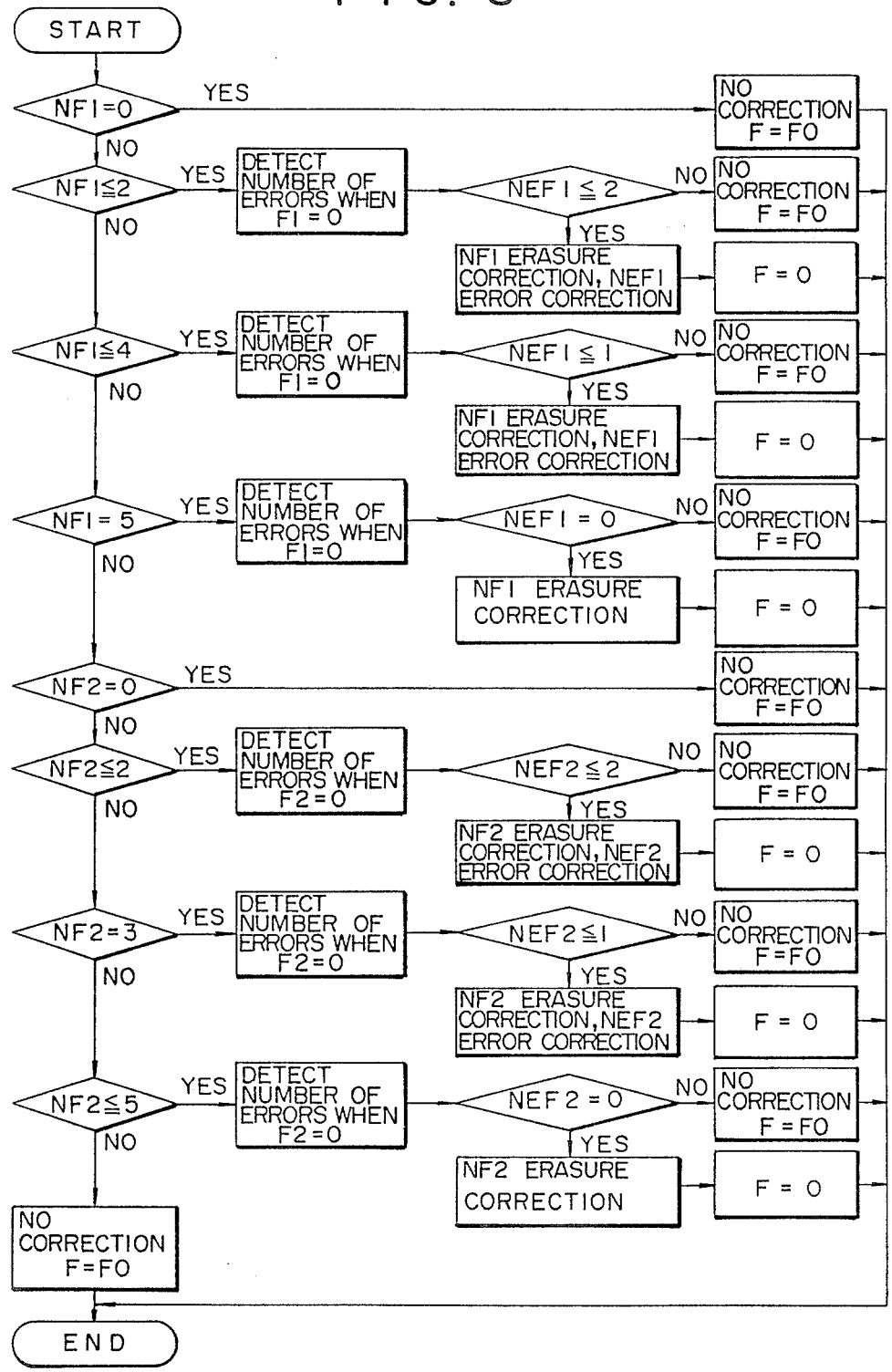
FIG. 8 is a flowchart showing the detail of the processes of erasure correction and error correction using first flags shown in FIG. 7

In FIG. 8, $NF_1$ and $NF_2$ denote the number of F1 flags and that of F2 flags counted for the second codewords, respectively. NEF1 and NEF2 represent the number of errors of F1=0 and that of F2=0, respectively An interpolation flag F is applied to the second codewords consisting of 32 symbols If F=0, no interpolation is applied to all the symbols If F=F0, the presence or absence of interpolation is decided in accordance with the value of F0 applied to each symbol.

Assuming that the minimum distance of the code is represented by d and the number of erasure corrections is p, then the number q (q is 0 or a positive integer) of the error corrections must satisfy the equation $$q \leq \left[ \frac{d - p - 1}{2} \right]$$

where the mark [] indicates decimals are to be omitted so as to provide integers.

Since, in this embodiment, the minimum distance (d) of the second codeword ($C_2$) is 7, the number of erasure corrections (p) by the first flags can take a value up to 6. In this embodiment, as seen from FIG. 8, when NF1 is 5 or less, the erasure correction and error correction are carried out using the F1 flags. When NF1 exceeds 5 and NF2 is 5 or less, the erasure correction and error correction are carried out using the F2 flags. In this way, since the erasure correction and error correction are carried out simultaneously, the error correction capability is enhanced.

Referring to FIG. 6 again, a logical sum of IF and F (represented by IF or F in FIG. 6) is used as new IF, whereby a logical sum of all the interpolation flags when the group number is 1 is obtained. The loop mentioned above is repeated four times incrementing the value of L one by one. Next, setting L=1 again, the second codewords belonging to the second group will be decoded. The manner of decoding the second group depends on the value of IF which represents whether or not any interpolation flag stands in the first group. More specifically, if IF=0, the burst error occurrence probability is low, so that six erasure corrections are carried out using the F2 flags to output an interpolation flag of F=0. On the other hand, if IF≠0, the above probability is high so that the correction of the second codewords is not carried out, but an interpolation flag of F=F0 is outputted. The above loop of decoding the second group is also repeated four times incrementing the value of L one by one.

As described above, in accordance with this embodiment, the second codewords are classified into two groups, at each completion of the interleaving of the error correction code having high correlation with the occurrence of burst errors, depending on whether or not the condition of NF1=NF2=6 is satisfied. At the decoding of the second codewords under the condition of NF1=NF2=6 having a high probability of misdetecting burst errors, the decoding procedure is changed depending on whether or not even a single interpolation flag has occurred in the decoding under any condition other than that, whereby it becomes possible to reduce error misdetection and to prevent generation of an unusual sound which deteriorates the quality of reproduced signals.

The maximum burst correction capability in this embodiment is the same as that of the prior art described in the above literature of the DAT Conference. Namely, this embodiment of the present invention can improve the burst error detection capability without deteriorating the maximum burst error correction capability.

Figure 9:
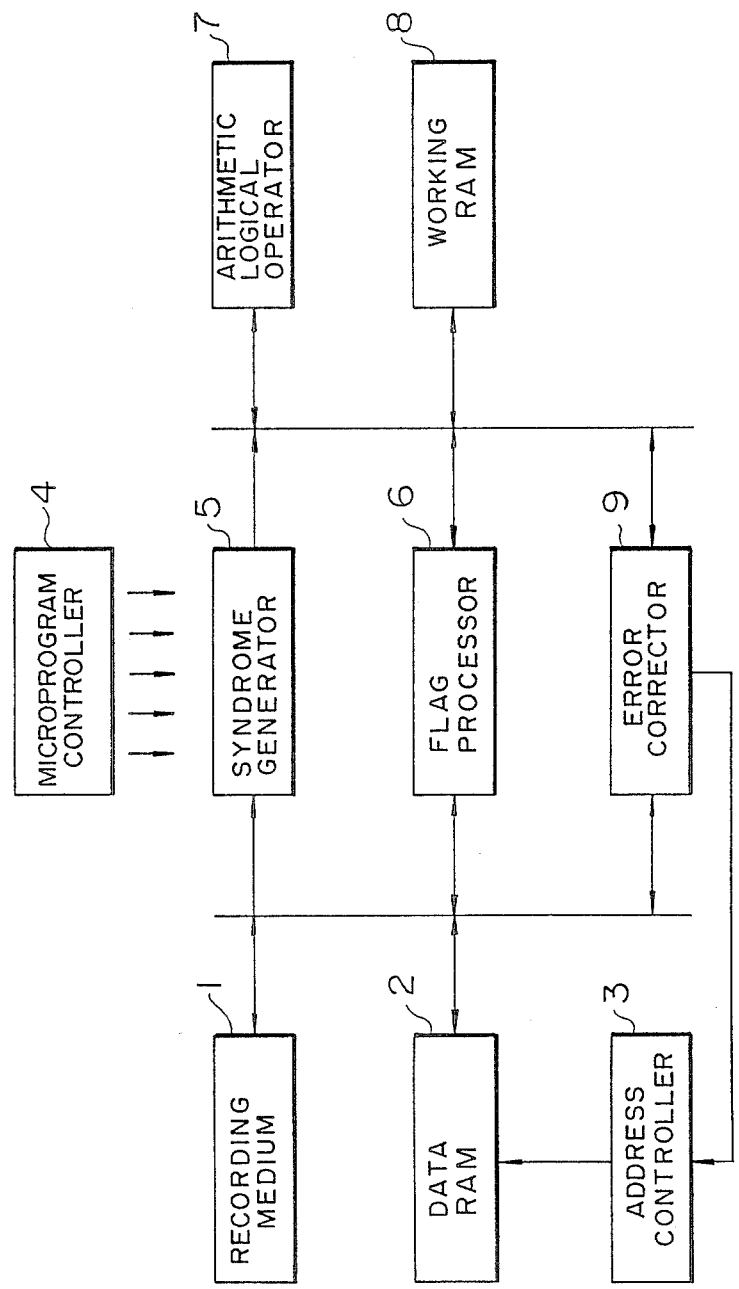
FIG. 9 is a block diagram showing an embodiment of the error detection and correction apparatus for executing the method of the present invention.

FIG. 9 shows an embodiment of the error detection and correction apparatus for executing the method of the present invention. In this figure, the apparatus includes a recording medium 1 such as a magnetic tape; a data RAM 2 for storing data read out from the recording medium 1 and its decoding state; an address controller 3 for controlling the addresses in the data RAM 2; a microprogram controller 4 for reading out and decoding a microprogram instruction to control the operation sequence of the error detection and correction apparatus; a syndrome generators for calculating the syndromes of first codewords and second codewords; a flag processor 6 which outputs first flags and interpolation flags representative of the decoding state and at the same time provides, when decoding the second codewords, the number of the first flags including the three kinds of flags F0, F1 and F2 when they take a value of 1 and also their locations at that time; an arithmetic logical operator 7 for performing the four fundamental arithmetic operations (addition, subtraction, multiplication and division) in the Galois field to calculate the error locations and the error patterns from the syndromes; working RAM 8 for storing variables required in decoding; and an error corrector a for correcting the error data read out from the data RAM 2 on the basis of the error locations and the error patterns obtained by the arithmetic logical operator 7 and returning the results to the data RAM 2.

The error detection and correction apparatus shown in FIG. 9 controls the kind of the operation in the arithmetic logical operator 7, judges the condition of the operation result, and is adapted to carry out the processings accompanying the condition judgement and branching such as classifying the second codewords into groups in accordance with the decoding states of the first codewords, decoding the second codewords in accordance with the order of the classified groups, changing the error correction processing in accordance with the decoding states of the second codewords decoded by that time, etc.

In the step of decoding the first codewords, the first codewords are initially read out from the data RAM 2 by means of the address controller 3 to calculate its syndrome using the syndrome generator 5. Next, the number of errors is detected from the syndrome using the arithmetic logical operator 7 and the working RAM 8 to provide the locations of errors and the error patterns The procedure of providing the error locations and error patterns is disclosed in, for example, Peterson and Weldon "Error-Correcting Codes" MIT Press, 1972. Thereafter, the data to be error-corrected is read out from the data RAM 2 using the error corrector 9 and the error-corrected data is returned to the data RAM 2. First flags representative of the decoding states of the first codewords are outputted using the flag processor 6 and stored in the flag area of the data RAM 2. The above decoding step of the first codewords is repeated $32 \times 4 = 128$ times.

Figure 1:
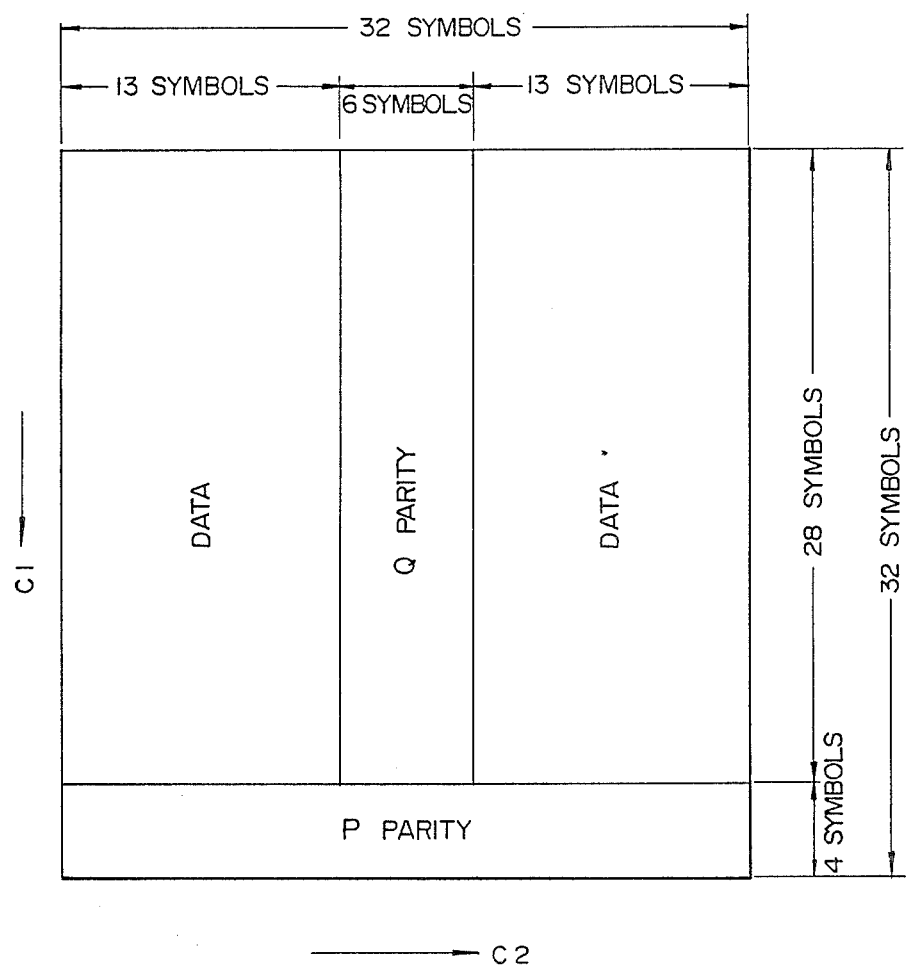
FIG. 1 shows the arrangement of an information code which has been doubly encoded by using the error detection and correction code.
Figure 2:
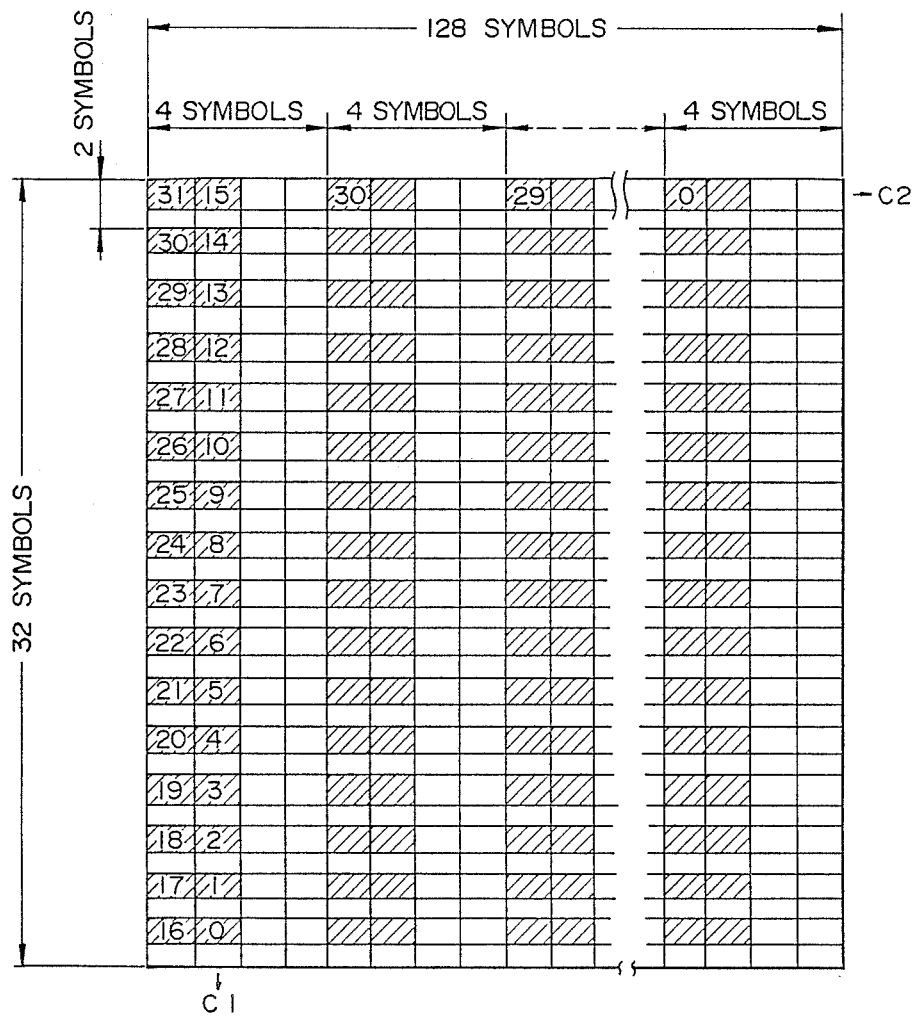
FIG. 2 is a view showing an interleaving format of the above information code.
Figure 3:
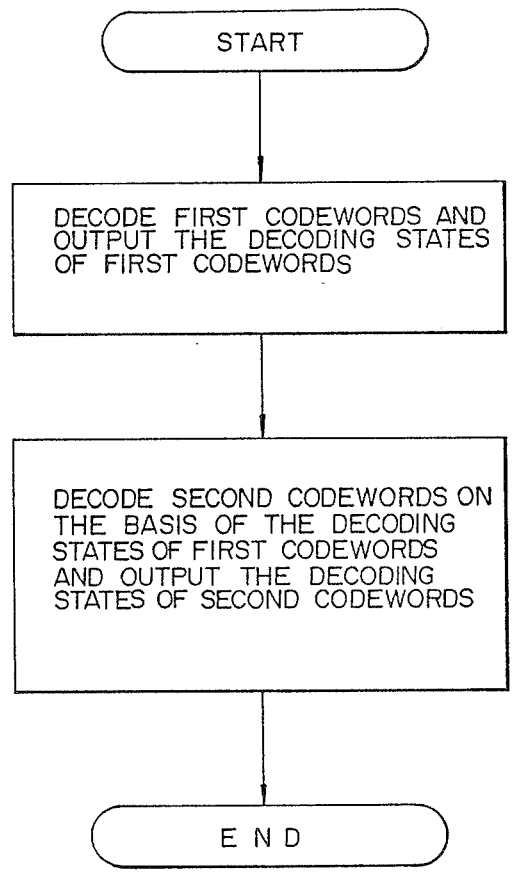
FIG. 3 is a flowchart showing a decoding process of a conventional error detection and correction method.

Next, the step of decoding the second codewords is carried out. First, the number of the first flags and their locations are obtained for each of four pages using the flag processor 6. The four pages are classified into two groups depending on whether the number of the first flags satisfies $NF1 = NF2 = 6$ or not. The second codewords are decoded in the order from the first group not satisfying the above condition. In decoding the second codewords, it is initially read out from the data RAM by means of the address controller 3 to calculate its syndrome using the syndrome generator 5. Next, the number of errors is detected from the syndrome using the arithmetic logical operator 7 and the working RAM to provide the error locations and the error patterns The processings so far are the same as in the decoding step of the first codewords. The decoding of the second codewords is different from that of the first codewords in that the erasure correction and error correction using the first flags are carried out. The procedure of performing the erasure correction from the syndrome is disclosed in an article entitled "Implementation of Reed-Solomon Erasure-Correcting Decoder for Hybrid Coding Scheme" by Fox and Huband in IEEE Trans. Commun. Tech. Vol. COM-19, No. 4, pp. 543-6 (August 1971) and an article entitled "On Decoding BCH Codes" by Forney in IEEE Trans. Inf. Theory vol. IT-11, No. 4, pp. 549-57 (October 1965). Thereafter, the data to be error-corrected are read out from the data RAM 2 using the error corrector 9 and the error-corrected data are returned to the data RAM 2. Interpolation flags representative of the decoding states of the second codewords are outputted using the flag processor 6 and stored in the flag area of the data RAM. A logical sum of IF, which represents the occurrence or nonoccurrence of any interpolation in the first group, and an interpolation flag F is taken to update IF. This decoding of the second codewords is carried out 32 times for each page and is repeated by the number of pages belonging to the first group. Next, the second group satisfying the condition of $NF1 = NF2 = 6$ will be decoded. First, whether or not $IF = 0$ is decided. If $IF = 0$, the six erasure corrections using the F2 flags are performed. If $IF \neq 0$, the correction is not carried out but an interpolation flag $F = F1$ is outputted to a data RAM 2. The decoding of the second group is repeated by the number of pages belonging to the second group. Thus, the error detection and correction of the information having the arrangement as shown in FIG. 2 are carried out.

Incidentally, in this embodiment, a processing unit, in which the interleaving of the error detection and correction code is completed, has been employed as a unit for classifying the second codewords into groups, but any other unit may be used if it has a correlation with the occurrence of burst errors.

We claim:

1. An error detection and correction method for decoding L pages of information codes which have been encoded doubly by error detection and correction codes, where L is greater than or equal to 2, said method comprising:

a first decoding step of decoding first codewords of said L pages of information codes and then outputting the decoding states thereof; and a second decoding step of decoding second codewords of said L pages of information codes such that the second codewords of said L pages of information codes are classified into K groups in accordance with the decoding state of the first codewords of said L pages of information codes, where L is greater than or equal to K which is greater than or equal to 2, the second codewords contained in a first group of information codes are decoded on the basis of the decoding state of the first codewords and then the decoding states thereof are outputted, and the second codewords contained in the i-th group of information codes are decoded on the basis of the decoding state of the first codewords and those of the second codewords contained in the first group to the (i−1)-th group of information codes and then the decoding states thereof are outputted, where i is less than or equal to K and is greater than or equal to 2.

2. An error detection and correction method according to claim 1, wherein said second decoding step comprises classifying the second codewords of said L pages of information codes into K groups by a sequential process wherein classification is performed sequentially in an order of lower error misdirection probability calculated from the decoding states of the first codewords of said L pages of information codes.

3. An error detection and correction method for decoding codes formed by interleaving L pages of information codes which have been encoded doubly by error detection and correction codes, where L is greater than or equal to 2, said method comprising:

a first decoding step of obtaining L pages of information codes by de-interleaving the interleaved doubly encoded information codes, decoding first codewords of said L pages of information codes and then outputting the decoding states thereof; and a second decoding step of decoding second codewords of said L pages of information codes such that the second codewords of said L pages of information codes are classified into K groups in accordance with the decoding states of the first codewords of said L pages of information codes, where L is greater than or equal to k which is greater than or equal to 2, the second codewords contained in a first group of information codes are decoded on the basis of the decoding states of the first codewords and then the decoding states thereof are outputted, and the second codewords contained in the i-th group of information codes are decoded on the basis of the decoding states of the first codewords and those of the second codewords contained in the first group to the (i−1)-th group of information codes and then the decoding states thereof are outputted, where i is less than or equal to K and is greater than or equal to 2.

* * * * *